(12) United States Patent
Kitamura et al.

(10) Patent No.: US 6,400,463 B2
(45) Date of Patent: *Jun. 4, 2002

(54) IMAGE PROCESSING SYSTEM

(75) Inventors: Toshiyuki Kitamura; Mitsuru Kurita, both of Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,023

(22) Filed: Jul. 29, 1998

Related U.S. Application Data

(62) Division of application No. 08/870,723, filed on Jun. 6, 1997, now Pat. No. 5,809,363, which is a continuation of application No. 08/342,043, filed on Nov. 17, 1994, now abandoned.

(30) Foreign Application Priority Data

Nov. 22, 1993 (JP) ............................................. 5-292234

(51) Int. Cl.⁷ .............................................. G06K 15/00
(52) U.S. Cl. ....................................... 358/1.15; 358/1.1
(58) Field of Search .................................. 395/114, 112, 395/101, 500, 500.44–500.49; 358/401, 403, 448, 450, 296, 407, 468; 399/2, 8; 703/23, 24, 25, 26, 27, 28

(56) References Cited

U.S. PATENT DOCUMENTS

| | | | | |
|---|---|---|---|---|
| 5,040,031 A | * | 8/1991 | Hayashi | 395/114 |
| 5,185,853 A | * | 2/1993 | Cheng et al. | 358/1.15 |
| 5,333,286 A | * | 7/1994 | Weinberger et al. | 395/500 |
| 5,692,229 A | * | 11/1997 | Ishimoto et al. | 358/448 |
| 5,809,363 A | * | 9/1998 | Kitamura et al. | 399/8 |

* cited by examiner

Primary Examiner—Gabriel Garcia
(74) Attorney, Agent, or Firm—Fitzpatrick, Cella, Harper & Scinto

(57) ABSTRACT

A system is constructed by connecting a plurality of digital copying machines (stations). having a common structure, and a master station 1001 and slave stations 1002 to 1004 are defined in accordance with their addresses. The master station 1001 issues a status request command to the slave stations at a predetermined time interval in order to gather information on the status of each slave station. The status which can be used in the system are recognized, depending upon the information, and a user selects the station or stations to be used. One of the station is made to read an original image, and the image is printed by the selected station or stations. The above constructed image processing system results in good expandability.

20 Claims, 13 Drawing Sheets

FIG. 5

| CODE | COMMAND | DESCRIPTION |
|---|---|---|
| 10 | INTERFACE CLEAR | ISSUED AFTER MASTER STATION WHEN IT IS TURNED ON |
| 01 | PRINT START | TRANSMITTING-SIDE OF IMAGE ISSUES INCLUDES: START-REQUESTING-SIDE ADDRESS; START-REQUESTED-SIDE ADDRESS; SELECTION OF PAPER SHEET; NUMBER OF COPY |
| 03 | STATUS REQUEST | ISSUED BY MASTER-STATION AT A PREDETERMINED PERIOD OF TIME INCLUDES REQUESTED SIDE ADDRESS |
| 05 | STATUS SEND | SAVE STATION ISSUES WITHIN A PREDETERMINED PERIOD OF TIME IN RESPONSE TO STATUS REQUEST ISSUED BY MASTER STATION INCLUDES SLAVE STATION ADDRESS, PRINT STATUS, INFORMATION ON ERROR, ETC. |
| 06 | IMAGE DATA TRANSFER COMPLETION | ORIGINATING STATION OF IMAGE DATA TRANSFER ISSUES AFTER COMPLETION OF IMAGE DATA TRANSFER |

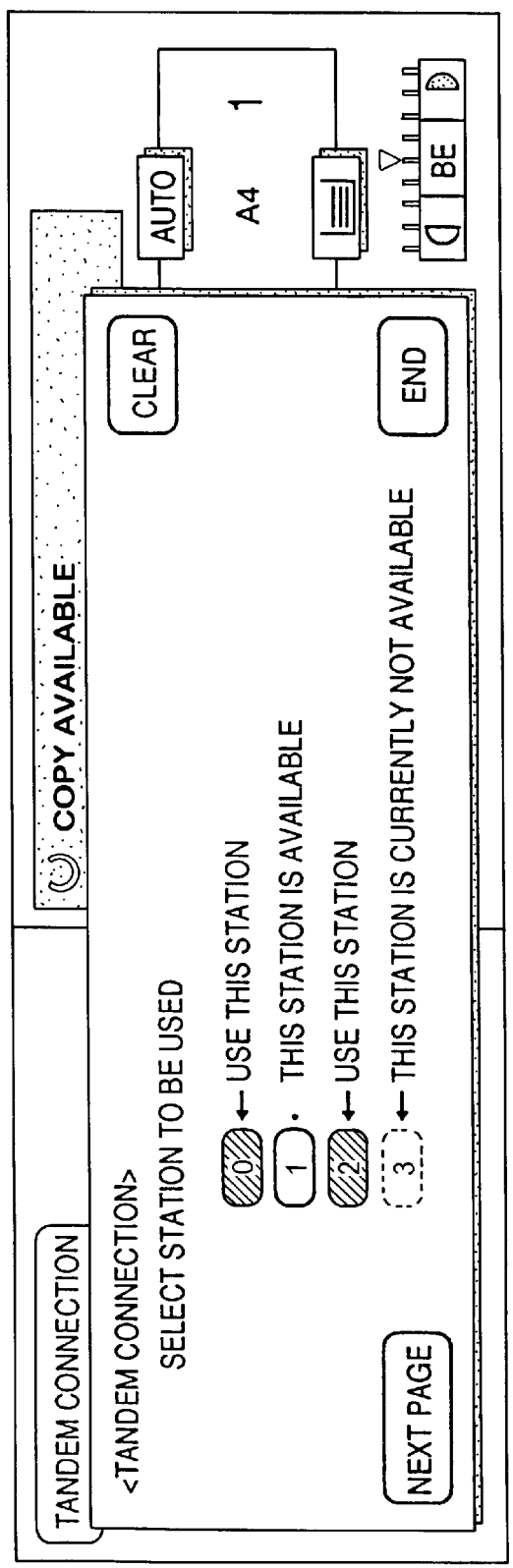

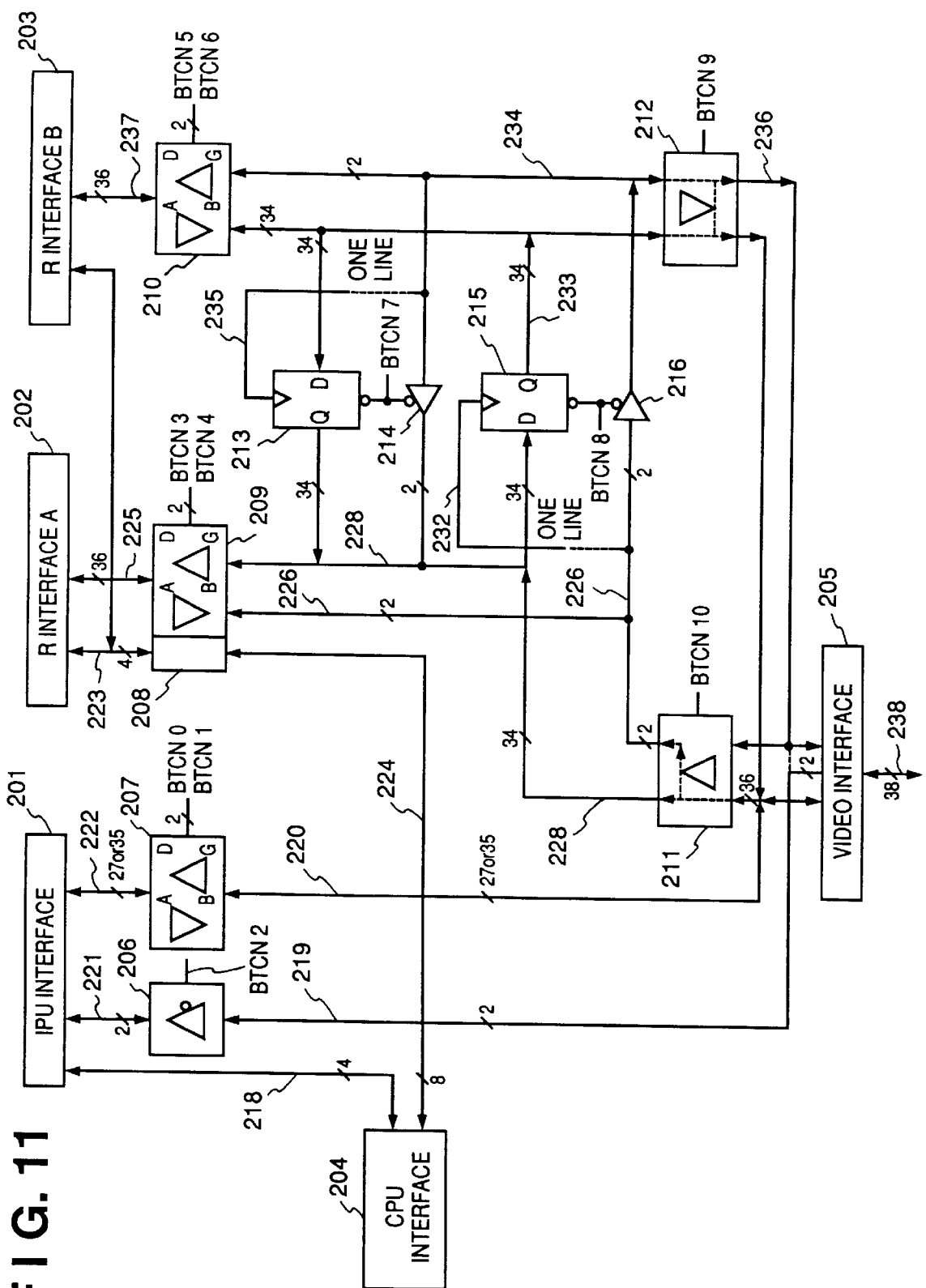
F I G. 11

IMAGE PROCESSING SYSTEM

This application is a division of Ser. No. 08/870,723, filed Jun. 6, 1997, now U.S. Pat. No. 5,809,363, which is a continuation of Ser. No. 08/342,043, filed Nov. 17, 1994, now abandoned.

BACKGROUND OF THE INVENTION

This invention relates to an image processing apparatus and, more particularly, to an image processing apparatus capable of forming an image based on image data obtained by converting an optically scanned image into an electrical signal, generated by a computer, or transmitted from an external apparatus, also capable of transmitting image data to an external apparatus.

Conventionally, it is possible to use a reader and a printer of a digital copying machine separately as an image reading apparatus and an image output apparatus, respectively. Therefore, the digital copying machine can be used as an image output apparatus by connecting with a conventional computer through an external interface, a plurality of digital copying machines (a plurality sets of readers and printers) can be connected with each other, the plurality of digital copying machines can be partitioned into readers and printers, and they can be connected with each other. Thus, a system attaining high performance printing capability is recently proposed, controlling the above printers and readers by a central processing unit (CPU). More specifically, the CPU control them so as to construct one system, then driving a plurality of printers simultaneously.

In a system configured by the above described digital copying machines, it is an outstanding object to achieve high speed printing by driving a plurality of printers simultaneously.

However, in the aforesaid system controlled by the central processing unit (CPU), a reader and a printer which can be connected to the CPU, or a number of sets of digital copying machines must be decided in advance, or the number of sets is limited, therefore there arises a problem in view of flexible expansion of the system.

SUMMARY OF THE INVENTION

Accordingly, it is an object of the present invention to provide an image processing apparatus which is flexible in expanding a system.

According to the present invention, the foregoing object is attained by providing an image processing apparatus comprising: reading means for optically reading an original image; converting means for converting the image read by the reading means into a digital image signal; storage means for storing the digital image signal; input/output means for outputting the digital image stored in the storage means to a first external apparatus, and for inputting a digital image signal generated by a second external apparatus; change-over means for changing input and output of the input/output means; relay means for relaying the digital image signal generated by the second external apparatus to the first external apparatus; communication means for communicating with the first and/or second external apparatus in order to control the input and output of the digital image signal by the input/output means and/or to control the relay of the digital image signals by the relaying means; image forming means for forming an image on the basis of the digital image signal stored in the storage means or of the digital image signal which is generated or relayed by the second external apparatus and which is inputted by the input/output means; output means for outputting the image formed by the image forming means onto recording medium; and control means for at least controlling the input and output of the digital image signal by the input/output means, the change-over between input and output by the change-over means, communication with the first and/or second external apparatus by the communication means, and the image forming by the image forming means.

In accordance with the present invention as described above, digital image data converted from the read original image is stored, and the image is outputted by transmitting to an external device by switching the function of the input/output means to "output", or an image is outputted by forming the image based on the image data or on image data generated in an external device.

It is another object of the present invention to provide a flexibly expandable image processing system. According to the present invention, the foregoing object is attained by providing an image processing system comprising a plurality of image forming apparatus, each apparatus comprising first and second interface means for inputting/outputting an image signal to/from the other image forming apparatus, image forming means for forming an image, and control means for controlling the input/output of the image signal in said first and second interface means, and controlling a supply of an image signal to said image forming means, wherein said control means has a mode for concurrently supplying input image signal from one of said first and second interface means, to said image forming means and the rest of said first and second interface means so that the same image can be formed in more than one image forming apparatuses.

In accordance with the present invention as described above, image data originating from one source is distributed into a plurality of image forming apparatuses so that the same image can be concurrently formed in the plurality of image forming apparatuses.

The present invention is particularly advantageous since input and output control of a digital image signal and/or communication for relay control can be internally performed in an apparatus, if a system is constructed of a plurality of apparatus as explained above, a special apparatus for controlling the entire system becomes unnecessary, and a system which does not depends on functions of the special apparatus can be composed, thus a system having flexibility in expansion can be constructed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 shows pertinent commands used in the tandem connection system;

FIG. 6 shows an example of display on a control panel of the color copying machine constructing the tandem connection system;

FIG. 11 shows a detailed configuration of the interface;

DESCRIPTION OF THE PREFERRED EMBODIMENTS

Preferred embodiments of the present invention will now be described in detail in accordance with the accompanying drawings.

[Schematic Explanation of the System (FIGS. 1-6)]

Figure 1:
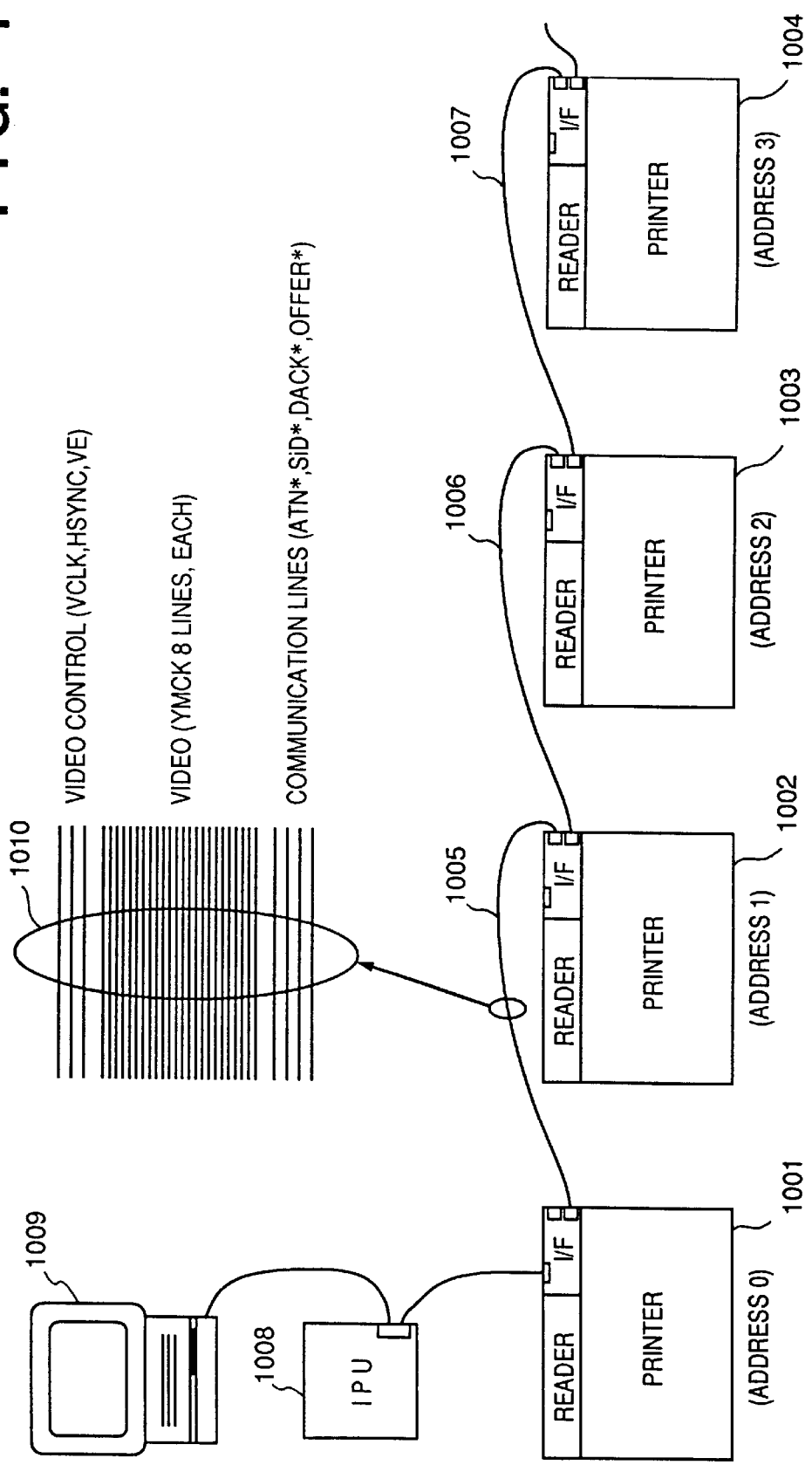
FIG. 1 illustrates a configuration of a tandem connection system constructed with a plurality of color copying machines according to a typical embodiment of the present invention.

FIG. 1 a block diagram illustrating a connection configuration of a copying system constructed with digital copying machines (called "tandem connection system" hereinafter) which is a typical embodiment of the present invention. In the same figure, each reference numeral from 1001 to 1004 denotes a set of digital copying machine (one machine of the set of digital copying machine is called "station" hereinafter), and each station is assigned a system address (called "address" hereinafter). The addresses are "0", "1", "2", and "3" for the stations 1001 to 1004, respectively, and they are unique values in the tandem connection system. It should be noted that it is necessary to have a system component having a value "0".

The stations 1001 to 1004 are connected with each other with connection cables 1005 to 1007, further connected with a computer (called "host" hereinafter) 1009 via an interface device 1008 (called "IPU" hereinafter). The internal construction of the connection cables 1005 to 1007 is referred as 1010 in FIG. 1, and as seen in the figure, the cable contains thirty-two video signal lines for YMCK signals (eight lines for each color component), three video control lines, and four communication lines.

Further, in the present embodiment, for connection of the station 1001 to 1004 by the connection cables 1005 to 1007 in order to switch over video signals used in the tandem connection system, a connection order which follows the address values is predetermined. In other words, the station having the address "0" is placed at the head of the station's connection, then the other stations are connected in the ascending order of the address.

Figure 2:
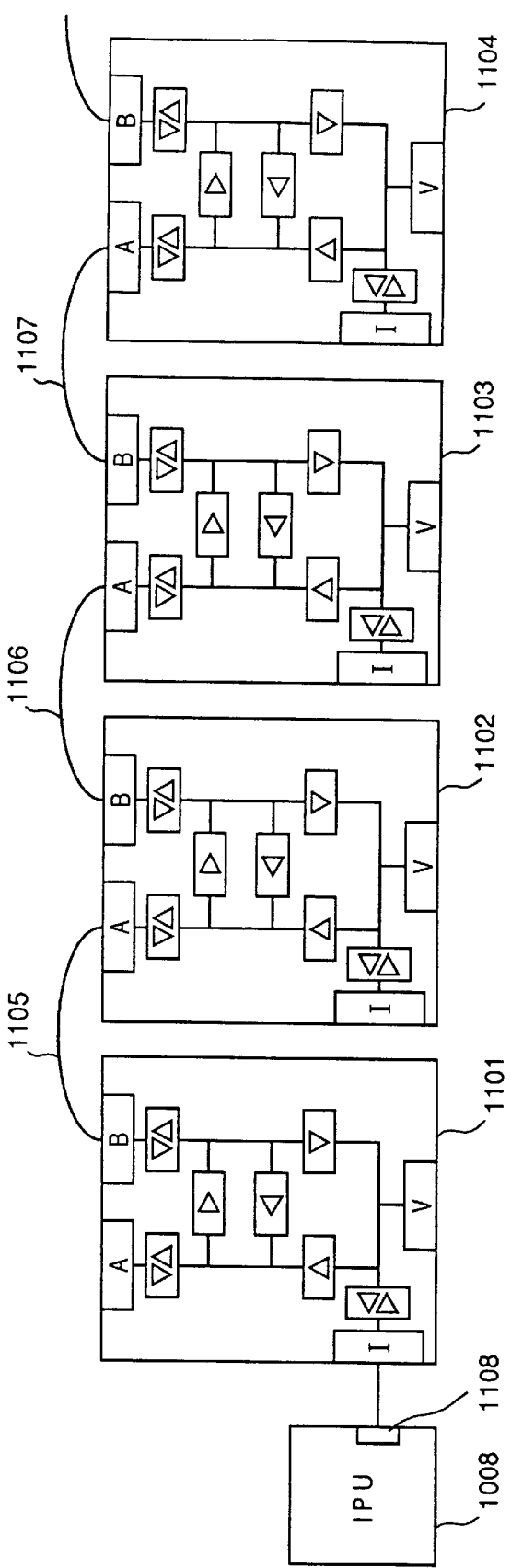
FIG. 2 illustrates a construction of interfaces of the color copying machines which compose the tandem connection system, and a connection configurations among the color copying machines.

FIG. 2 shows a connection configuration of video signal in the tandem connection system. In FIG. 2, reference numerals 1101 to 1104 denote interfaces (I/F) of the respective stations 1001 to 1004, and reference numeral 1108 denotes I/F of IPU 1008. Reference numerals 1105 to 1107 indicate the twenty four video signal lines for RGB signals and the three video control lines inside of the respective connection cables 1005 to 1007. Further, A and B in the each I/F 1001 to 1004 show connection points of the stations, where the connection point A is used to connect with the other station having the smaller address value than itself, and the connection point B is used to connect with the other station having the larger address value than itself.

Figure 3:
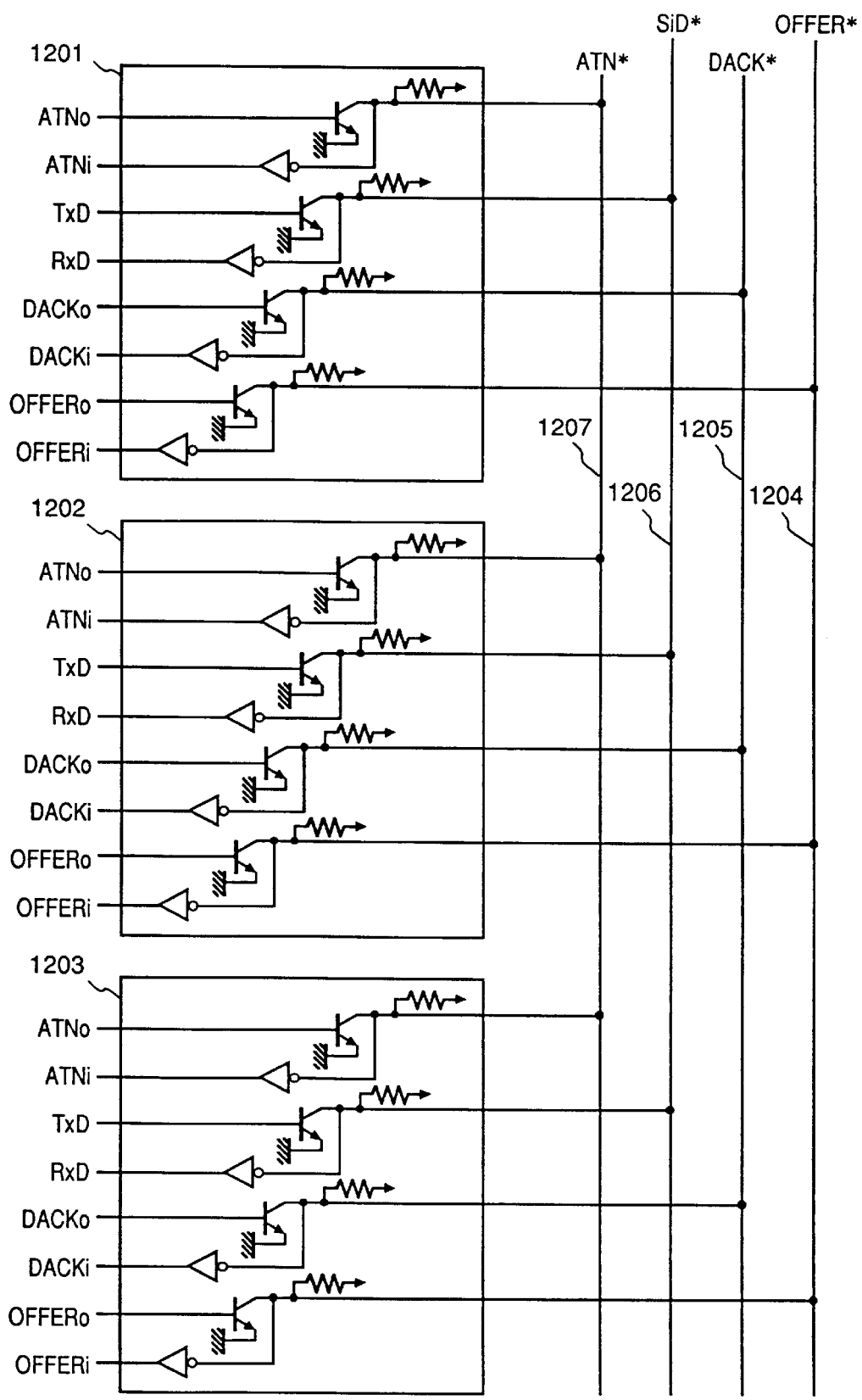
FIG. 3 illustrates constructions of communication lines included in connecting cables which connect the color copying machines in FIG. 1, and detailed constructions of the interfaces for connecting with the communication lines.

FIG. 3 shows a connection configuration of serial communication lines for communicating with other system components in the tandem connection system. In FIG. 3, reference numerals 1201 to 1203 denote interfaces especially for serial communication included in the I/Fs 1101 to 1103 of the respective stations 1001 to 1003. Reference numerals 1204 to 1207 denote four communication lines, namely, OFFER*, DACK*, SiD*, and ATN* which are included in the connection cables 1005, 1006, and 1007, respectively.

The ATN* is a synchronization signal which represents that transmission of data from a master station (station having the address "0") in the tandem connection system is in process, and when the signal value of the ATN* is "L" (low), the data is transmitted. In the stations other than the master station (called "slave stations" hereinafter), the ATN* line is always set as an input mode.

Regarding the signal, OFFER*, when the slave station transmits data to the master station, the signal value of the OFFER* becomes "L". In the master station, the OFFER* line is always set as an input mode. The plurality of the slave stations are connected with wired-OR.

The DACK* is a signal indicating the end of the data reception by the receiving side, and each stations are connected with the wired-OR. Thus, in a case where the receiving side has a plurality of stations, when the last station which has finished receiving data makes the DACK* inactive, the DACK* in the line becomes inactive, too. Thereby the timing of receiving the data among the stations are synchronized.

The SiD* is bidirectional serial data, and the data is exchanged in synchronization with the ATN* (from master to slave) and the OFFER* (from slave to master). The method of transmitting data is a halfduplex start-stop synchronization method, and transmission speed and a data format are set at the starting time of the system.

Eight other signal lines, each of which is to be connected with controller (not shown) of each station, outputted from the I/Fs 1201 to 1203. TxD and RxD are connected with transmitting unit and receiving unit, respectively, of an I/O port (not shown) which operates a serial communication; ATNo, DACKo, and OFFERo, with respective input units of the I/O port (not shown); and ATNi, DACKi, and OFFERi, with respective output units of the I/O port (not shown).

Figure 4:
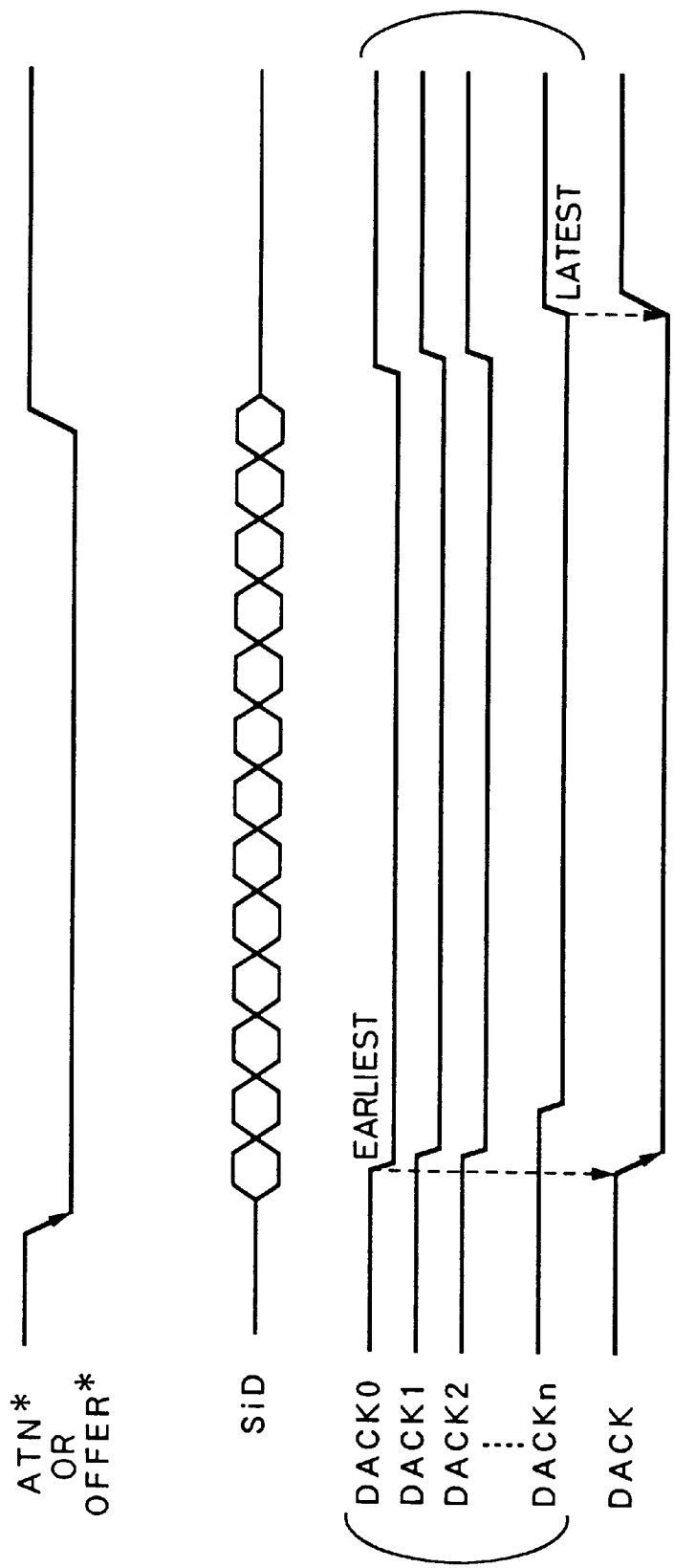
FIG. 4 is a time chart showing relationship among control signals used on the communication lines shown in FIG. 3.

FIG. 4 is a timing chart of the respective signal at the data transmission. As shown in FIG. 4, in synchronization with the "L" of the signal ATN* or the signal OFFER* is "L"(in other words, at the time when data is transmitted from the master station or when data is transmitted from the slave station), the signal SiD* is interchanged between the master station and the slave station. When the signal ATN* is "L" and data is transmitted from the master station to the plurality of the slave stations, for instance, the DACK* signal of the slave station which starts receiving the data first becomes "L" (DACK0 in FIG. 4), then the DACK* signal line becomes "L". Further, the DACK* signal of the last station which has finished receiving the data becomes "L" (DACKn in FIG. 4), the DACK* signal line becomes "H" (high).

FIG. 5 shows pertinent commands used for communications via the communication lines 1204 to 1207 in a case where the tandem connection system is constructed with the above-described interfaces.

An interface clear command (code "10") is for reset parameters relating the tandem connection system, and it is issued to the master station and the slave station by the master station after the master station having the system address "0" has initialized itself, and the OFFER* is set as an input mode at the master station. Whereas, each slave station sets the ATN* to be the input mode in accordance with the received command, and initializes internal parameters.

A status request command (code "03") is a polling command for collecting information such as states of the slave stations connected to the tandem connecting system, and it is issued to the slave stations by the master station after a fixed time period after the master station has issued the interface clear command. The status request command includes the request address for designating one of the slave stations as a parameter.

A status send command (code "05") is for the slave station designated by the status request command to report the states of itself to the other stations in the tandem connection system. In a case where the master station designates the slave station, the designated slave station must replay by this command within a predetermined period of time. The command includes parameters such as the system address of the designated slave station, whether or not any error occurred, various kinds of flags showing a waiting state and a copying state, kinds of paper sheet, and whether or not the paper sheets are supplied. In a case where the slave station which is designated by the status request command from the master station does not issue the status send command after elapse of a predetermined period of time, the master station determines that the designated slave station is not connected to the tandem connection system.

The print start command (code "01") is for designating which station is being addressed to print an image, or how many copies are assigned to which stations to print, and making the stations to be prepared for receiving an image. The command is issued by the originating station of image transfer. The command includes the image transmitting-side address, image receiving-side address, a size of the printing sheet, and a number of prints, and so on as parameters.

An image data transfer completion command (code "06") is for the image transmitting-side station to report the completion of transmitting an image to other stations.

FIG. 6 shows an example of a display on a control panel provided on the each station 1001 to 1004. In FIG. 6, information showing which stations are available and which stations are not available is displayed.

[Detailed Description of Construction of Digital Copying Machine (FIGS. 7 to 12)]

Figure 7:
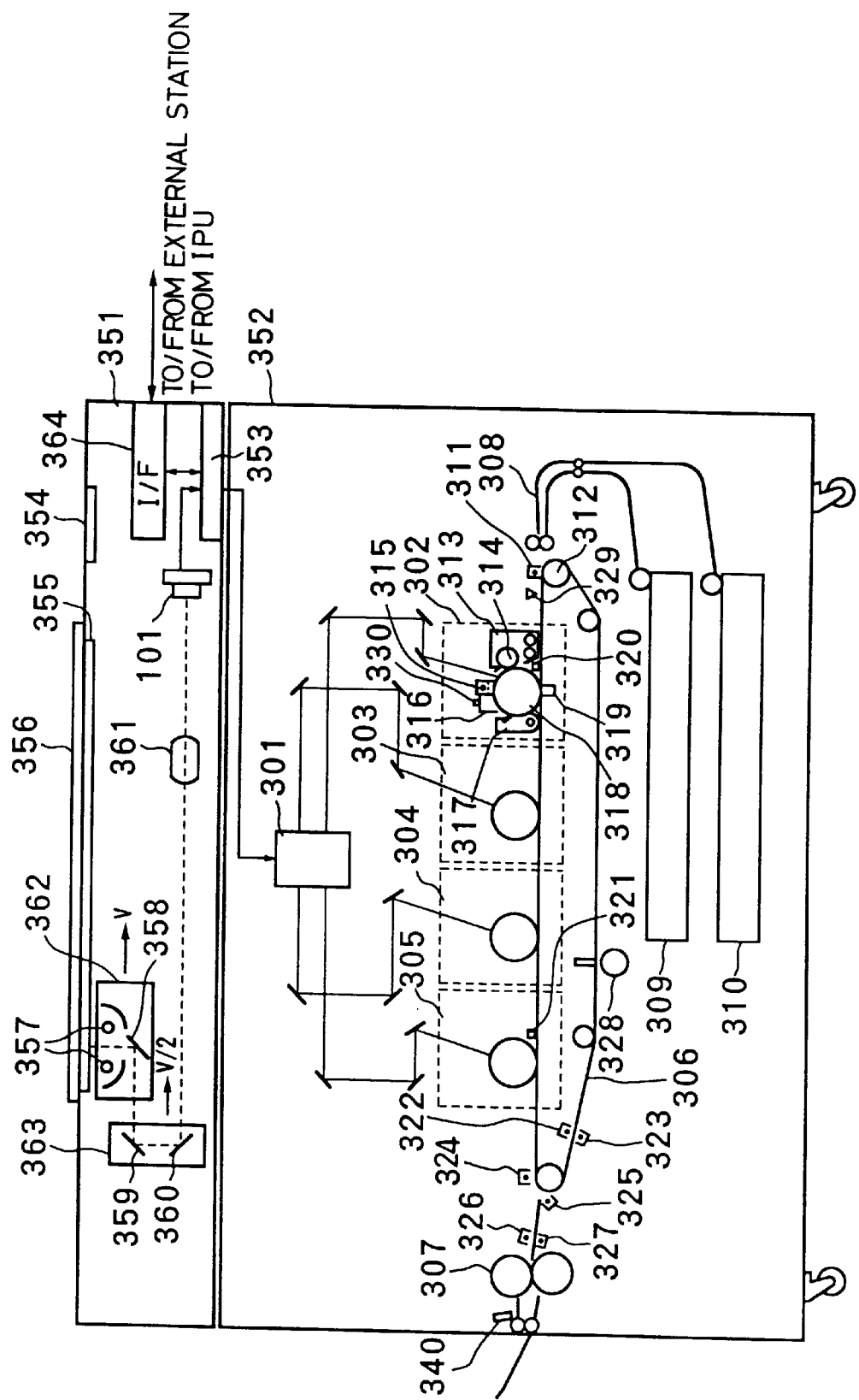
FIG. 7 is a cross sectional view illustrating the construction of the color copying machine composing the tandem connection system.

FIG. 7 is a cross sectional view showing the structure of the digital copying machine used as each station 1001 to 1004. The digital copying machine comprises a color reader 351 for reading a color original and performing digital edition, and a printer 352 having a plurality of electrostatic drums to form a color image based on digital image signals of different colors which are sent from the color reader 351.

Further, in FIG. 7, reference numeral 101 denotes a CCD; 353, a digital image processor; 354, the control panel indicated with reference to FIG. 6; 355, a platen glass; 356, a document cover; 357, a halogen lamp; 358 to 360, mirrors; 361, a lens for focusing reflected light from the halogen lamp 357 on the CCD 101; 362, a carriage holding the halogen lamp 357 and the mirror 358; 363, a carriage holding the mirrors 359 and 360; 364, an interface (I/F) with other stations or the IPU 1008. The carriage 362 has a velocity v and the carriage 363 has a velocity v/2, and they scan (subscan) the entire original image by mechanically moving in the perpendicular direction with respect to the electrical scanning (main scanning) direction of the CCD 101.

<Configuration of the Color Reader 351>

Figure 8:
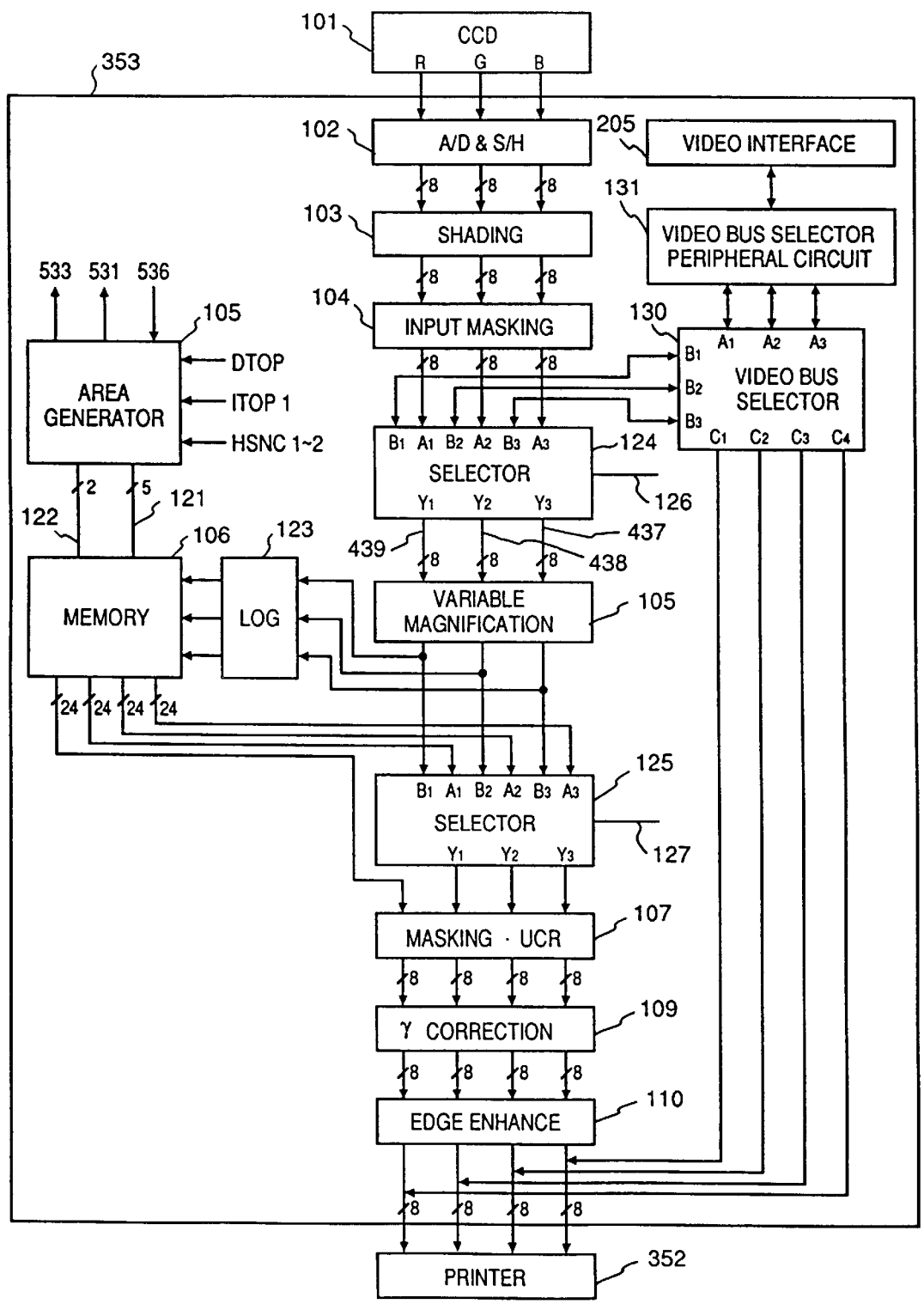
FIG. 8 is a block diagram illustrating the construction of the digital image processor 353 of a color reader of the color copying machine.

FIG. 8 is a block diagram illustrating the detailed configuration of the digital image processor 353 of the color reader 351. A color original on the platen glass 355 is exposed by the halogen lamp 357, and its reflected image is received by the CCD 101 and converted to electrical signals. The electrical signals are inputted into the digital image processor 353.

The electrical signals inputted from the CCD 101 are processed by sample-and-hold operation at an A/D converter and a sample-and-hold (S/H) circuit 102, and converted from analog signals to digital signals, thereby digital signals of RGB components are generated. The RGB data is subject to shading correction and black correction at a shading circuit 103, then are connected to NTSC signals at an input masking circuit 104. A selector 124 (controlled by a signal 126 from a CPU which is not shown) selects either an image signal (A1 to A3 side) generated based on the original image or an image signal (B1 to B3 side) transmitted from an external device, and outputs the selected signal into a variable magnification circuit 105. The variable magnification circuit 105 performs expansion or compression in the main scanning direction, and outputs the result to a LOG circuit 123 and a selector 125 (controlled by a signal 127 from a CPU which is not shown).

The output from the LOG circuit 123 is inputted to a memory 106, thus video data are stored. The memory 106 stores YMC color component data. The color data are read at the proper timings for forming latent images on four electrostatic drums.

A masking UCR circuit 107 performs four color masking and UCR processing on the output signal from the selector 125, then color data which are expressed with YMCK components are outputted. Then a γ-correction circuit 109 performs the γ-correction on the YMCK components, and a edge enhance circuit 110 performs edge enhance. Color data after the γ-correction and the edge enhance are outputted to the printer 352.

In FIG. 8, DTOP is an output from an image top sensor (not shown), HSNC1 is an internally generated horizontal synchronization signal, HSNC2 is an externally generated horizontal synchronization signal, ITOP1 is an output from a paper top sensor 329 (described hereinafter), reference numeral 122 denotes one bit of reading enable signal and one bit of writing enable signal of the memory 106 in the main scanning direction generated on the basis of an externally generated writing enable signal 536 in the sub-scanning direction, and reference numeral 121 denotes one bit of writing enable signal in the sub-scanning direction and four bits of four reading enable signals each of which corresponds to each color component (YMCK) in the sub-scanning direction. Each of the signals 121 and 122, a ITOP signal 531, and a video enable signal 533 in the sub-scanning direction is generated in the area generator 105 based on the ITOP1 signal, the HSNC1 signal, the externally generated writing enable signal 536 in the sub-scanning direction, the DTOP signal, and so on, respectively.

Further, reference numeral 130 denotes a video bus selector for outputting/inputting a video signal to/from an external circuit.

<Configuration of the Bus Selector 130>

Figure 9:
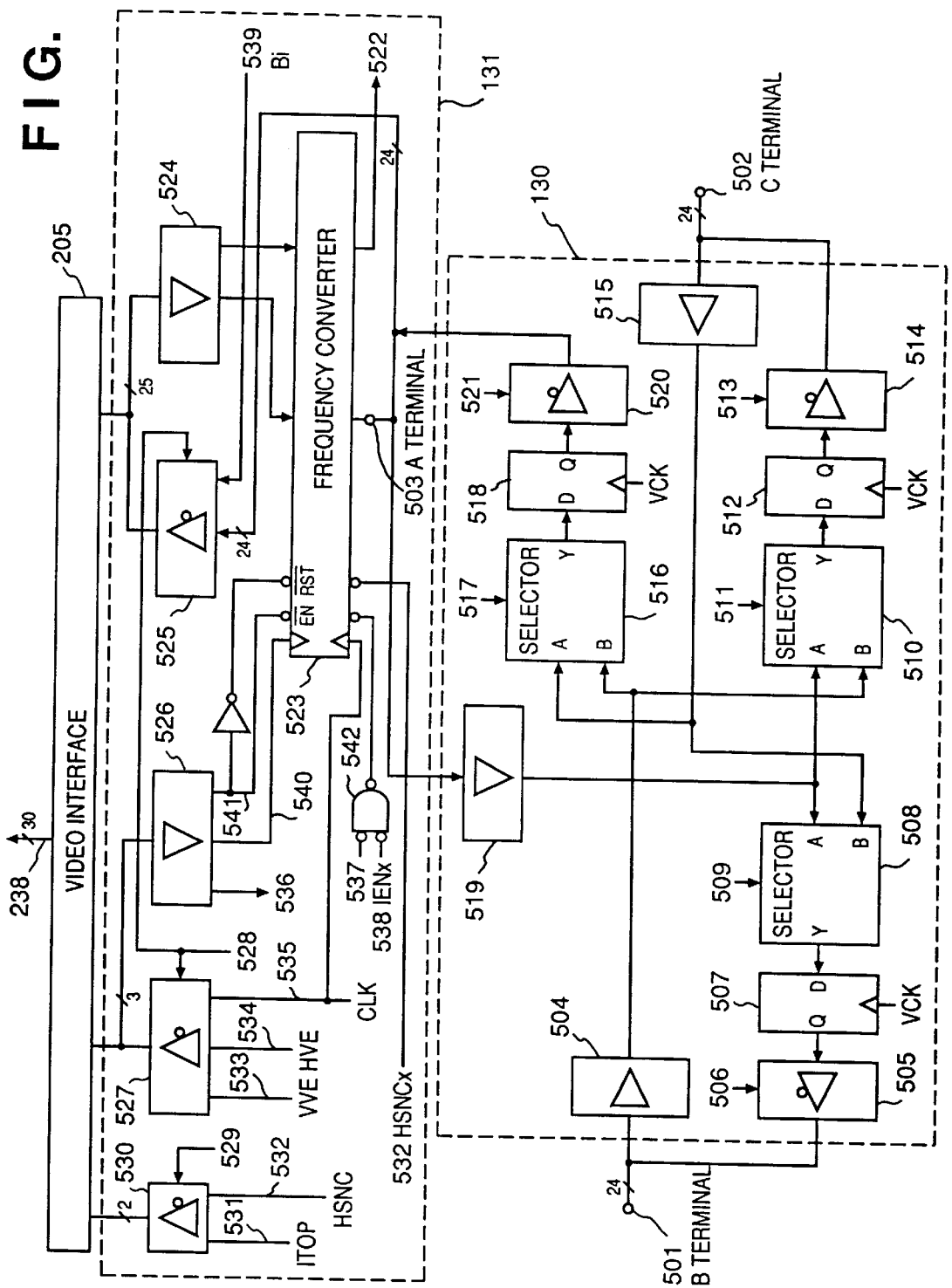
FIG. 9 is a block diagram illustrating the detailed configuration of a video bus selector 130 and a video bus selector peripheral circuit 131.

FIG. 9 is a block diagram illustrating a configuration of the video bus selector 130 and its peripheral circuit 131. In FIG. 9, pairs of 504 and 505, 514 and 515, 519 and 520, 526 and 527, and 524 and 525 are bidirectional buffers, 530 is an output buffer, 506, 513, 521, 528, and 529 are signal lines for controlling the bidirectional buffers from CPU (not shown), and 523 is a frequency converter which is constructed with FIFO buffers.

Further, reference numeral 501 denotes a B terminal corresponding to B1 to B3; 502, a C terminal corresponding to C1 to C4; and 503, a A terminal corresponding to A1 to A3, of the video bus selector 130 in FIG. 8. Reference numeral 508 denotes a selector which selects either A terminal input or C terminal input; 507, a flip-flop (DF/F) which transmits an output from the selector 508 to the output buffer 505 for the B terminal 501 at a timing based on a signal VCK; 510, a selector which selects either A terminal input or B terminal input; 512, a flip-flop (DF/F) which transmits an output from the selector 510 to the output buffer 514 for the C terminal 502 at a timing based on a signal VCK; 516, a selector which selects either B terminal input or C terminal input; and 518, a flip-flop (DF/F) which transmits an output from the selector 516 to the output buffer 521 for the A terminal 503 in synchronization with a signal VCK.

Furthermore, reference numeral 531 denotes a sub-scanning direction synchronization signal (ITOP) of the IPU 1008; 532, a main scanning direction synchronization signal (HSNCX) of the IPU 1008; 533, a sub-scanning direction write enable signal (VVE1) to the other stations; 534, a main scanning direction enable signal (HVE*) to the other stations; 535, a video clock (VCK) to itself or to the other stations; 536, a sub-scanning direction write enable signal from the other stations (a master station); 509, 511, 517, and 537, signals which are set at the CPU (not shown); 538, a enable signal (IENX) for the frequency converter 523; 539, a binary signal, which is stored in a bitmap memory when it is available inside, to be transmitted to outside; 540, a video clock from the other stations which is used as a write clock for the frequency converter 523; and 541, a write enable signal for the frequency converter 523 (Note that the inverted signal is for write reset signal for the frequency converter 523). Reference numeral 542 is an OR gate. Further, an inverted signal of HSNCX 532 is used as a read reset signal of the frequency converter 523. Reference numeral 522 is a binary signal transmitted from the other stations when the stations have bitmap memories inside themselves.

Next, a flow of a video signal in the various kinds of modes, which are described below, is explained with reference to FIGS. 8 and 9. The stations 1001 to 1004 which are digital copying machines in this embodiment are connected with each other. They have a mode to copy an original image read by a station at its own station (called a "normal copy" mode) as well as a mode to transmit the read original image to the other stations as a video signal (called an "external interface output" mode). Further they have a mode to receive video signal and print the original image read by the other stations (called an "external interface input" mode)

(Normal Copy Mode)
   (1) Flow of a video signal
      Original Image→CCD 101→A/D and S/H Circuit 102→Shading Circuit 103→Input Masking Circuit 104→Selector 124 (selects A input)→Variable Magnification Circuit 105→LOG Circuit 123→Memory 106→Selector 125 (selects A input)→Masking UCR Circuit 107→γ-Correction Circuit 109→Edge enhancing Circuit 110→Printer 352

(2) Signal Setting of the Video Bus Selector 130 and the Peripheral Circuits
      Signals 506, 513, 528, and 529→High "1"
      Signal 537→High "1"
      Signals 509, 511, and 517→X
      Signal 521→X
      Signal 537→High "1"

(External Interface Output Mode)
   (1) Flow of a Video Signal
      Original image→CCD 101→A/D and S/H Circuit 102→Shading Circuit 103→Input Masking Circuit 104→Selector 124 (selects A input)→Variable Magnification Circuit 105→Selector 125 (selects B input)→Masking UCR Circuit 107→γ-Correction Circuit 109→Edge Enhancing Circuit 110→Video Bus Selector 130→Video Interface 205→External Apparatus (2) Signal Setting of the Video Bus Selector 130 and its Surrounding Circuits
      Signals 506 and 513→High "1"
      Signals 509 and 511→X
      Signals 517, 521, 528, and 529→Low "0"
      Signal 537→High "1"

(External Interface Input Mode)
   In a case where data source is a host 1009
   (1) Flow of a video signal
      From External Apparatus (Host 1009, IPU 1008)→Video Interface 205→Video Bus Selector 130→Selector 124 (selects B input)→Variable Magnification Circuit 105 LOG Circuit 123→Memory 106→Selector 125 (selects A input)→Masking UCR Circuit 107→γ-Correction Circuit 109→Edge Enhancing Circuit 110→Printer 352, where the signal 536 which is inputted to the area generator 105 is used as a sub-scanning direction write enable signal for the memory 106.

(2) Setting of a video selector and its peripheral circuits
      Signal 506→Low "0"
      Signal 509→Low "0"
      Signal 511→X
      Signal 513→High "1"
      Signal 517→Low "0"
      Signals 521 and 528→High "1"
      Signal 529→Low "0"
      Signal 537→Low "0"
   In a case where data source is a station
   (1) Flow of a Video Signal
      From External Apparatus (Station)→Video Interface 205→Video Bus Selector→Printer 352
   (2) Setting of a Video Selector and its Peripheral circuits
      Signal 513→Low "0"
      Signal 511→Low "0"
      Signal 509→X
      Signal 506→High "1"
      Signal 517→Low "0"
      Signals 521 and 528→High "1"

<Configuration of the Printer 352>

In FIG. 7, reference numeral 301 denotes a polygon scanner which uses a laser beam illuminating on the electrostatic drum, and reference numeral 302 indicates a image forming unit for magenta (M), and reference numerals 303 to 305 denote image forming units for cyan (C), yellow (Y), and black (B), respectively.

Figure 10:
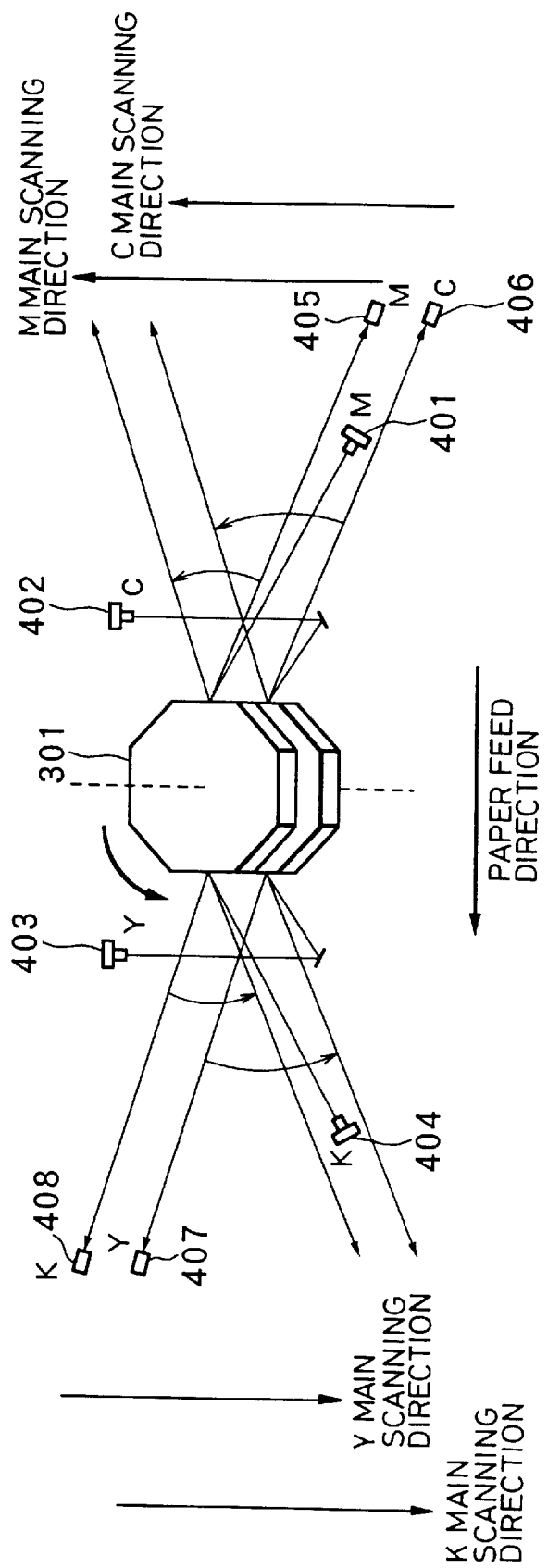
FIG. 10 shows a construction of a polygon mirror scanner of a printer 352.

As shown in FIG. 10, laser beams from laser elements 401 to 404 for MCYBk components which are individually driven by a laser controller (not shown) scan the electrostatic drum via a polygon scanner 301 based on each color component data. Reference numerals 405 to 408 denote a BD detector for detecting the scanned laser beam and generating a main scanning direction synchronization signal. In a case where two polygon mirrors are placed in a same rotation axis and rotated by one motor as in this embodiment, the laser beam for M and C and the laser beam for Y and Bk, for example, scan to the opposite direction to each other with respect to a main scanning line. Thus, image data of Y and Bk is formed to be a mirror image of the scanned image of Y and Bk with respect to the main scanning direction in order that the mirror image of Y and Bk matches to the scanned image of M and C when they are overlaid.

Regarding the magenta (M) image forming unit 302, an electrostatic drum 318 forms a latent image by scanning a laser beam, a developer 303 develops a toner image of the latent image on the electrostatic drum 318, a unit 314 is provided in a developer 313 to apply developing bias voltage, a primary corona discharge device 315 charges the electrostatic drum 318 to a desired potential, a cleaner 317 cleans the surface of the electrostatic drum 318 after transferring the image, dos-charger 316 discharges the surface of the electrostatic drum 318 which is cleaned by the cleaner 317 so that the electrostatic drum can be charged in good condition by the primary corona discharge device 315, a pre-exposure lamp 330 deletes the residual charge on the electrostatic drum 318, and a transfer corona discharge device 319 discharges from the back-side of the transfer belt 306 in order to transfer the toner image on the electrostatic drum 318 to recording medium (e.g., a recording paper sheet).

Further, reference numerals 309 and 310 denote a cassettes which store recording medium; 308, a paper feeder for supplying the recording medium from the cassettes 309 and 310; 311, an attracting corona discharge device for making the recording medium fed by the paper feeder 308 attracted to the belt 306; 312, a transfer belt used for rotating a transfer belt 306 as well as charging a transfer belt 306, used with the attracting corona discharge device 311, so that it attracts the recording medium.

Reference numeral 324 denotes a discharger which makes it easier for the recording medium to separate from the transfer belt 306; 325, a separating corona discharge device which prevents the image quality from being deteriorated by electric discharge occurred at the recording medium separation from the transfer belt 306; and 326 and 327, the pre-fixing chargers which prevent image quality deterioration by supplementing the attracting power of the toner to the recording medium after separation. Further, reference numerals 322 and 323 denote transfer belt charge removing corona discharge device which remove electric charge from the transfer belt 306 so as to electrostatically initialize it; 328, a belt cleaner to remove pollution from the transfer belt 306; 307, a fixing device which fixes the toner image, re-charged by the pre-fixing transfer corona discharge devices 326 and 327, on the recording medium by applying heat; and 340, a paper discharge sensor which detects the recording medium on a conveying path passing through the fixing device.

A paper top sensor 329 detects the top edge of the recording medium fed on the transfer belt 306, and a detection signal (ITOP1) generated by the paper top sensor 329 is sent from the printer 352 to the color reader 351 where the signal is used for generating the sub-scanning direction synchronization signal when a video signal is sent from the color reader 351 to the printer 352.

<Configuration of the Interface 364>

FIG. 11 is a view of a circuit illustrating the detailed configuration of each I/F 1101 to 1104 of each station 1001 to 1004 which is shown in FIG. 2. The interface of one station out of four stations is used for an explanation below, thus reference numeral of the interface in FIG. 11 is referred as "364" which is used for an interface in FIG. 7.

The I/F 364 is composed of five interfaces, namely, an interface 201 for the IPU 1008 (IPU interface), interfaces 202 and 203 for the other stations (R interface A and R interface B, respectively), a CPU interface 204 for controlling communications with the IPU 1108 and the other stations, and an interface 205 for the apparatus of itself (video interface). The interface 202 is used to connect with the station having the smaller address value compared to the address value of itself, and the interface 203 is used to connect with the station having the larger address value compared to the address value of itself. Therefore, as seen in the connection configuration in FIG. 2, if the I/F is of the master station, the interfaces 201 and 203 are used, whereas if the I/F is of the slave station, the interfaces 202 and 203 are used. The interface 202 corresponds to the connecting point A and the interface 203 corresponds to the connecting point B, of each I/F 1101 to 1104 of each station shown in FIG. 2.

In FIG. 11, reference numerals 206, 211, 212, 214, and 216 denote tristate buffers; 207, 209, and 210, bidirectional buffers; 208, a special bidirectional input/output buffer which will be explained later; and 213 and 215 are D-type flip-flops having a tristate function.

Further, BTCN0 to BTCN10 are control signals set by the CPU (not shown), reference numeral 218 denotes a communication line between the IPU 1008 and the apparatus of itself (four bits), reference numerals 219 and 221 denote a main scanning direction synchronization signal (HSNC) and a sub-scanning direction synchronization signal (ITOP), respectively, which use two bits altogether. Reference numerals 220 and 222 denote a twenty-seven bit signal composed of three components of video signals each of which uses eight bits (twenty-four bits, altogether), a binary signal (Bi), image clock signal (CLK), and main scanning enable signal (HVE); 223, a four-bit communication signal for communicating with other stations; 224, a eight-bit communication signal for communicating with other stations; 225, a thirty-six bit signal composed of four components of video signals, Bi, HVE, Sub-scanning video enable signal (VVE), and CLK; 226, a two-bit signal composed of CLK and VVE; 228 and 233, a thirty-four-bit signal composed of four components of video signals, Bi, and HVE; 232 and 235, a CLK; 234 a two-bit signal composed of CLK and VVE; 236, VVE; 237, a thirty-six-bit signal composed of four components of video signals, Bi, HVE, VVE, and CLK; and 238, a thirty-bit or thirty-eight-bit signal composed of three or four components of video sighals, Bi, CLK, HE, HSNC, VVE, and ITOP.

A flow of a control of I/O port and of a signal in each mode will be discussed below.

Control signals (BTCN2, BTCN10, BTCN9, BTCN7, and BTCN8), applied on the buffers 206, 211, 212, 214, and 216 which are tristate buffers. In these states low "0" corresponds to enable, while high "1" corresponds to high-impedance. The bidirectional buffers 207, 209, and 210 are utilized by an element such as LS245, and in accordance with control signals (BTCN0 and BTCN1, BTCN3 and BTCN4, BTCN5 and BTCN6) applied on G and D terminals, if the state of the G terminal is low "0" and the state of the D terminal is low "0", then the data flows from B to A. On the other hand, if the state of G terminal is low "0" and the state of the D terminal is high "1", then the data flows from A to B. If the state of G terminal is high "1", then the data does not flow in both direction (so called "isolation"). The D type flip-flops 213, 215 are enabled when the state of the enable signals (BTCN7, BTCN8) are low "0", whereas the D type flip-flops 213 and 215 have high impedance when the state of the enable signals are high "1".

In the tandem connection system of this embodiment, the IPU 1008 and stations 1001 to 1004 are connected with each other as shown in FIG. 1. Each station 1001 to 1004 has the identical construction, thus each of these stations has a data transmission/reception mode as described hereinafter so that, whenever one of these station assigned to be the master station or to be the slave station, a video image data can be transmitted or received to/from the other stations.

Regarding the mode explained below, one of these stations is mainly considered, and when the station is indicated, it is called a "main station", further when data is transmitted to the other station and/or the IPU without storing the data in the "main station", the process is called a "main station relay". Furthermore, the station having smaller address value than the address value of the main station is called a "lower address station", whereas the station having larger address value than the address value of the main station is called a "higher address station".

Mode 1: IPU→Main Station Relay→Lower Address Station

Mode 2: IPU→Main Station Relay→Higher Address Station

Mode 3: IPU→Main Station

Mode 4: Lower Address Station→Main Station Relay→Higher Address Station

Mode 5: Lower Address Station→Main Station

Mode 6: Higher Address Station→Main Station Relay→Lower Address Station

Mode 7: Higher Address Station→Main Station

Mode 8: Main Station→IPU

Mode 9: Main Station→Lower Address Station

Mode 10: Main Station→Higher Address Station

Mode 11: IPU→Main Station Relay→Higher Address Station and Lower Address Station Mode 12: IPU→Main Station and Main Station Relay→Lower Address Station Mode 13: IPU→Main Station and Main Station Relay→Higher Address Station Mode 14: IPU→Main Station and Main Station Relay→Higher Address Station and Lower Address Station Mode 15: Lower Address Station→Main Station and Main Station Relay→Higher Address Station Mode 16: Higher Address Station→Main Station and Main Station Relay→Lower Address Station Mode 17: Main Station→IPU and Lower Address Station Mode 18: Main Station→IPU and Higher Address Station Mode 19: Main Station→Higher Address Station and Lower Address Station Mode 20: Main Station→IPU and Higher Address Station and Lower Address Station Note that the interface 201 is used for the transmission, reception, and relay of data with the IPU 1008; the interface 202, with the lower address station; and the interface 203, with the higher address station.

The states of the control signals BTCN1 to BTCN10 from the CPU, and flows of a video image signal, and a synchronization signal in each mode are as follow.

<Mode 1>

BTCN0→High "1"
BTCN1→Low "0"
BTCN2→Low "0"
BTCN3→Low "0"
BTCN4→Low "0"
BTCN5→X
BTCN6→X
BTCN7→High "1"
BTCN8→X
BTCN9→High "1"
BTCN10→Low "0", where X denotes a signal which does not affect the processing of the mode.

Flows of the video image signal and the synchronization signal are as follow, where the numbers indicate reference numerals of signal lines in FIG. 11.

238→219→221
222→220→228→225
238→236+220→226→225.

<Mode 2>

BTCN0→High "1"
BTCN1→Low "0"
BTCN2→Low "0"
BTCN3→X
BTCN4→High "1"
BTCN5→Low "0"
BTCN6→Low "0"
BTCN7→High "1"
BTCN8→Low "0"
BTCN9→High "1"
BTCN10→Low "0"

Flows of the video image signal and the synchronization signal are as follow, where the numbers indicate reference numerals of signal lines in FIG. 11.

238→219→221
222→220→228→233→237
238→236+220→226→234→237

<Mode 3>

BTCN0→High "1"
BTCN1→Low "0"
BTCN2→Low "0"
BTCN3→X
BTCN4→X
BTCN5→X
BTCN6→X
BTCN7→X
BTCN8→X
BTCN9→High "1"
BTCN10→Low "0"

Flows of the video image signal and the synchronization signal are as follow, where the numbers indicate reference numerals of signal lines in FIG. 11.

238→219→221
222→220→238

\<Mode 4\>
    BTCN0→X
    BTCN1→X
    BTCN2→X
    BTCN3→High "1"
    BTCN4→Low "0"
    BTCN5→Low "0"
    BTCN6→Low "0"
    BTCN7→High "1"
    BTCN8→Low "0"
    BTCN9→X
    BTCN10→High "1"
    Flows of the video image signal and the synchronization signal are as follow, where the numbers indicate reference numerals of signal lines in FIG. 11.
    225→228→233→237
    225→226→234→237
\<Mode 5\>
    BTCN0→X
    BTCN1→High "1"
    BTCN2→X
    BTCN3→High "1"
    BTCN4→Low "0"
    BTCN5→X
    BTCN6→High "1"
    BTCN7→High "1"
    BTCN8→Low "0"
    BTCN9→Low "0"
    BTCN10→High "1"
    Flows of the video image signal and the synchronization signal are as follow, where the numbers indicate reference numerals of signal lines in FIG. 11.
    225→228→233+234→220→238
    225→226→234→236→238
\<Mode 6\>
    BTCN0→X
    BTCN1→X
    BTCN2→X
    BTCN3→Low "0"
    BTCN4→Low "0"
    BTCN5→High "1"
    BTCN6→Low "0"
    BTCN7→Low "0"
    BTCN8High "1"
    BTCN9→X
    BTCN10→High "1"
    Flows of the video image signal and the synchronization signal are as follow, where the numbers indicate reference numerals of signal lines in FIG. 11.
    237→233→228→225
    237→234→226→225
\<Mode 7\>
    BTCN0→X
    BTCN1→High "1"
    BTCN2→# X
    BTCN3→X
    BTCN4→X
    BTCN5→High "1"
    BTCN6→Low "0"
    BTCN7→X
    BTCN8→High "1"
    BTCN9→Low "0"
    BTCN10→X
    Flows of the video image signal and the synchronization signal are as follow, where the numbers indicate reference numerals of signal lines in FIG. 11.
    237→233+234→220→238
    237→234→236→238
\<Mode 8\>
    BTCN0→Low "0"
    BTCN1→Low "0"
    BTCN2→Low "0"
    BTCN3→X
    BTCN4→X
    BTCN5→X
    BTCN6→X
    BTCN7→X
    BTCN8→X
    BTCN9→High "1"
    BTCN10→X
    Flows of the video image signal and the synchronization signal are as follow, where the numbers indicate reference numerals of signal lines in FIG. 11.
    238→220→222
    238→219→221
\<Mode 9\>
    BTCN0→X
    BTCN1→High "1"
    BTCN2→X
    BTCN3→Low "0"
    BTCN4→Low "0"
    BTCN5→X
    BTCN6→X
    BTCN7→Low "0"
    BTCN8→X
    BTCN9→High "1"
    BTCN10→Low "0"
    Flows of the video image signal and the synchronization signal are as follow, where the numbers indicate reference numerals of signal lines in FIG. 11.
    238→220→228→225
    238→236+220→226 225
\<Mode 10\>
    BTCN0→X
    BTCN1→High "1"
    BTCN2→X
    BTCN3→X
    BTCN4→High "1"
    BTCN5→Low "0"
    BTCN6→Low "0"
    BTCN7→High "1"
    BTCN8→Low "0"
    BTCN9→High "1"
    BTCN10→Low "0"
    Flows of the video image signal and the synchronization signal are as follow, where the numbers indicate reference numerals of signal lines in FIG. 11.

238→220→228→233→237
238→236+220→226→234→237

<Mode 11>

BTCN0→High "1"
BTCN1→Low "0"
BTCN2→Low "0"
BTCN3→Low "0"
BTCN4→Low "0"
BTCN5→Low "0"
BTCN6→Low "0"
BTCN7→High "1"
BTCN8→Low "0"
BTCN9→High "1"
BTCN10→Low "0"

Flows of the video image signal and the synchronization signal are as follow, where the numbers indicate reference numerals of signal lines in FIG. 11.

238→219→221
222→220→228→225
222→220→228→233→237
238→236+220→226→225
238→236+220→226→234→237

<Mode 12>

BTCN0→High "1"
BTCN1→Low "0"
BTCN2→Low "0"
BTCN3→Low "0"
BTCN4→Low "0"
BTCN5→X
BTCN6→High "1"
BTCN7→High "1"
BTCN8→X
BTCN9→High "1"
BTCN10→Low "0"

Flows of the video image signal and the synchronization signal are as follow, where the numbers indicate reference numerals of signal lines in FIG. 11.

238→219→221
222→220→238
238→220→228→225
238→236+220→226→225

<Mode 13>

BTCN0→High "1"
BTCN1→Low "0"
BTCN2→Low "0"
BTCN3→X
BTCN4→High "1"
BTCN5→Low "0"
BTCN6→Low "0"
BTCN7→High "1"
BTCN8→Low "0"
BTCN9→High "1"
BTCN10→Low "0"

Flows of the video image signal and the synchronization signal are as follow, where the numbers indicate reference numerals of signal lines in FIG. 11.

238→219→221
222→220→238

222→220→228→233→237
238→236+220→226→234→237

<Mode 14>

BTCN0→High "1"
BTCN1→Low "0"
BTCN2→Low "0"
BTCN3→Low "0"
BTCN4→Low "0"
BTCN5→Low "0"
BTCN6→Low "0"
BTCN7→High "1"
BTCN8→Low "0"
BTCN9→High "1"
BTCN10→Low "0"

Flows of the video image signal and the synchronization signal are as follow, where the numbers indicate reference numerals of signal lines in FIG. 11.

238→219→221
222→220→238
222→220→228→225
222→220→228→233→237
238→236+220→226→225
238→236+220→226→234→237

<Mode 15>

BTCN0→x
BTCN1→X
BTCN2→High "1"
BTCN3→High "1"
BTCN4→Low "0"
BTCN5→Low "0"
BTCN6→Low "0"
BTCN7→High "1"
BTCN8→Low "0"
BTCN9→Low "0"
BTCN10→High "1"

Flows of the video image signal and the synchronization signal are as follow, where the numbers indicate reference numerals of signal lines in FIG. 11.

225→228→233→237
225→226→234→237
225→228→234+233→220→238
225→226→234→236→238

<Mode 16>

BTCN0→X
BTCN1→High "1"
BTCN2→X
BTCN3→Low "0"
BTCN4→Low "0"
BTCN5→High "1"
BTCN6→Low "0"
BTCN7→Low "0"
BTCN8→High "1"
BTCN9→X
BTCN10→High "1"

Flows of the video image signal and the synchronization signal are as follow, where the numbers indicate reference numerals of signal lines in FIG. 11.

237→233→228→225
237→234→226→225
237→233+234→220→238
237→234→236→238
<Mode 17>
  BTCN0→Low "0"
  BTCN1→Low "0"
  BTCN2→Low "0"
  BTCN3→Low "0"
  BTCN4→Low "0"
  BTCN5→X
  BTCN6→X
  BTCN7→High "1"
  BTCN8→X
  BTCN9→High "1"
  BTCN10→Low "0"
  Flows of the video image signal and the synchronization signal are as follow, where the numbers indicate reference numerals of signal lines in FIG. 11.
  238→219→221
  238→220→222
  238→228→225
  238→220+236→226→225
<Mode18>
  BTCN0→Low "0"
  BTCN1→Low "0"
  BTCN2→Low "0"
  BTCN3→x
  BTCN4→High "1"
  BTCN5→Low "0"
  BTCN6→Low "0"
  BTCN7→High "1"
  BTCN8→Low "0"
  BTCN9→High "1"
  BTCN10→Low "0"
  Flows of the video image signal and the synchronization signal are as follow, where the numbers indicate reference numerals of signal lines in FIG. 11.
  238→219→221
  238→220→222
  238→228→233→237
  238→220+236→226→234→227
<Mode 19>
  BTCN0→X
  BTCN1→High "1"
  BTCN2→X
  BTCN3→Low "0"
  BTCN4→Low "0"
  BTCN5→Low "0"
  BTCN6→Low "0"
  BTCN7→High "1"
  BTCN8→X
  BTCN9→High "1"
  BTCN10→Low "0"
  Flows of the video image signal and the synchronization signal are as follow, where the numbers indicate reference numerals of signal lines in FIG. 11.
  238→228→225
  238→228→233→237
  238→220+236→226→225
  238→220+236→226→234→237
<Mode 20>
  BTCN0→Low "0"
  BTCN1→Low "0"
  BTCN2→Low "0"
  BTCN3→Low "0"
  BTCN4→Low "0"
  BTCN5→Low "0"
  BTCN6→Low "0"
  BTCN7→High "1"
  BTCN8→Low "0"
  BTCN9→High "1"
  BTCN10→Low "0"
  Flows of the video image signal and the synchronization signal are as follow, where the numbers indicate reference numerals of signal lines in FIG. 11.
  238→219→221
  238→220→222
  238→228→225
  238→228→233→237
  238→220+236→226→225
  238→220+236→226→234→237

[Explanation on the configuration of the IPU]

Figure 12:
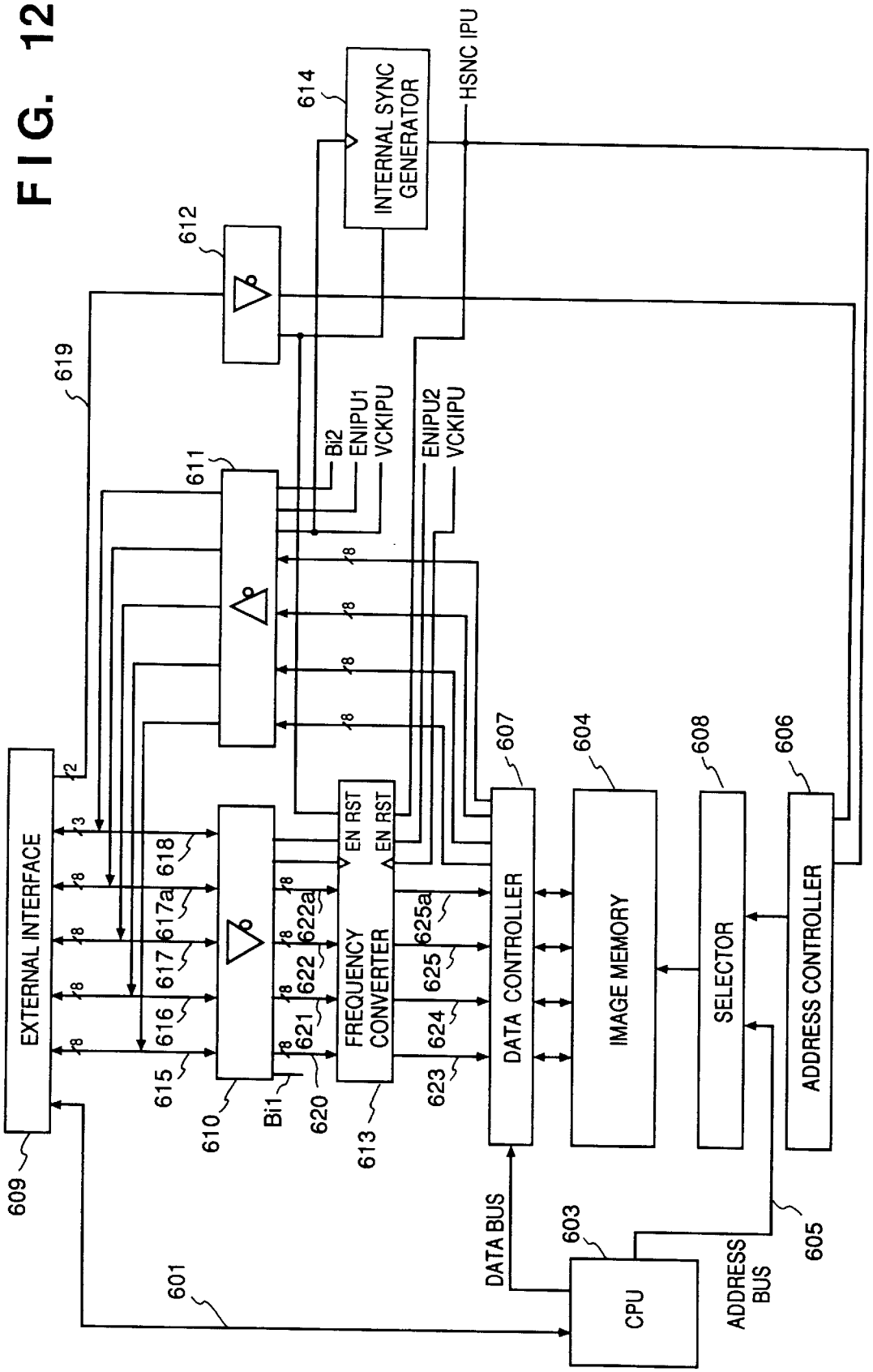
FIG. 12 is a block diagram showing an internal construction of an image memory unit (IPU)

FIG. 12 is a block diagram illustrating the internal configuration of the image memory unit in the interface device (IPU) 1008. The IPU 1008 stores a color image signal sent from an external device (e.g., an image data from the color reader 351 of each station, an image data from the host 1009) in an image memory 604, and outputs the data stored in the image memory to an external device (the color reader 351 of the each station, in this embodiment) in synchronization with the external device.

Next, respective functions are explained below.

(1) Write the Color Image Signal into the Image Memory

YMCK signals 615 to 617, 617a (eight bits each) which are inputted from an external interface 609 being set to an input mode are sent to a frequency converter 613 (FIFO is used) through a tristate buffer 610 and signal lines 620 to 622, 622a. At this time, the CPU 603 controls so that the tristate buffers 610 and 612 become enable states, and that the other tristate buffer 611 becomes disable.

The frequency converter 613 uses an external clock (one bit out of three-bit signal 618) as a write clock signal, an external main scanning direction synchronization signal (one bit out of three-bit signal 618) as a write reset signal, and an external main scanning direction synchronization signal (one bit out of three-bit signal 618) as a write enable signal, further uses an internal clock (VCKIPU) as a read clock signal, an internal main scanning direction synchronization signal (HSYNCIPU generated by an internal SYNC generator 614 in accordance with the external main scanning direction synchronization signal and VCKIPU) as a read reset signal, and a write enable signal (ENIPU2 generated by an area enable generator (not shown) in accordance with the internal main scanning direction synchronization signal and VCKIPU) as a control signal. Thereby the external image clock and the image clock in a memory unit are synchronized (Note that the main scanning direction synchronization signal is a signal from the color reader 351), then the output signals 623 to 625, 625a are written in an image memory 604 via a data controller 607.

The image memory 604 has a pixel size up to thirty-six bits (eight bits per each RGB or YMCK per one pixel), and the control of the memory control signals at this time is performed by the address controller 606 in accordance with the external sub-scanning direction enable signal (one bit out of the two-bit signal 619), HSYNCIPU, and so on via the selector 608.

Next, to write to the image memory 604 from the host 1009 will be explained hereinafter.

Regarding writing to the CPU 603 from the host 1009, first, image data sent via GPIB or the like, for example, is stored in the memory (not shown) of the CPU 603 via the external interface 609 and the signal line 601. Then, the CPU 603 controls the data controller 607, and selector 608, further the image data from the host 1009 is written to the image memory 604. To transfer the image, DMA might be used.

(2) Color Image Data Output to External Devices

The data stored in the image memory 604 is read in accordance with an address, which is generated by the address controller 606 based on the main scanning direction synchronization signal and the sub-canning direction synchronization signal that are inputted from the external interface 609 and tristate buffer 612, so that the data is outputted to the external interface of the color reader 351 via the data controller 607, tristate buffer 611, and the external interface 609. At this time, the CPU 603 controls ENIPU2 to be disable state, the try state buffers 611 and 612 to be enable state, and the try state buffer 610 to be disable state.

The procedure to output an original image on the platen of the reader of a station out of a plurality of stations in the tandem connection system having aforementioned construction.

Let four stations 1001 to 1004 be connected to a tandem system as shown in FIG. 1, and an original image is placed on the platen 355 of the color reader 351 of the station 1001. After confirming that the stations 1002 to 1004 can be used without any problem by operating a control panel screen as shown in FIG. 6, all the stations 1001 to 1004 are set to ready for output, then a number of copies is set.

By pressing a "copy start" key of the station 1001, the station 1001 distributes the designated number of copies to each stations, and issues a print start command to all the stations. When the stations 1002 to 1004 receive the print start command, parameters such as the number of copies and a size of the printing paper sheet suitable to the command are set automatically. Then each station changes an input source of the video signal into a suitable position in accordance with a system address of the station which issued the command and a system address of its own station, further changes settings of control to write to the image memory of itself in order to follow signals from VIDEO control lines (VCLK, HSYNC, VE), then waits for the image signal.

Whereas, the station 1001 changes settings for reading the original image, further changes so that the control signal for writing in the image memory of its own station is also outputted to the VIDEO control line, then starts reading the original image. Each station 1002 to 1004 writes into their respective image memory by using the control signal outputted from the station 1001. When the reading of the image is completed by the station 1001, the station 1001 issues an "end of the image transfer" command, thereby each station starts printing-out the image.

By following the same procedure as explained above, in a case where the original image is placed any one of the stations 1001 to 1004, the output of the image from a plurality of stations can be performed by operation of the control panel of the station having the original on its platen.

Next, a procedure of outputting data from the host 1009 which is connected to the station 1001 in the tandem connection system, via the IPU 1008 for outputting to a plurality of stations will be explained.

Note that information on the states of all the stations connected to the tandem connection system is gathered by the host 1009 through the IPU 1008. The stations to be used, number of copies, size of printing paper sheets, and so on are set by operation by the host 1009 depending upon the state of the tandem connection system, then the image data to be outputted is transferred to the IPU 1008.

The IPU 1008 provides the set-up information to the station 1001 which is connected to the system. The station 1001 which received the notice issues a "start printing" command to the other stations to be used for output. The stations which received the "start printing" command process the same procedure as in the case of the aforesaid output of the image on the platen, then wait for the image signal.

After the station 1001 which is connected with the IPU 1008 changes the image data transmitting/receiving mode showing the transmitting-side and receiving-side of the video signal to the "input from the IPU" and "output to the other station" mode (mode 13, for instance), the station 1001 issues a command to the IPU 1008 to instruct transmitting the image. All the used VIDEO control signals for reading the image from the IPU 1008 and for writing to the other stations are generated by the station 1001 which is connected with the IPU 1008.

Therefore, the image data read from the IPU 1008 is written in the image memory of the stations 1001 as well as written in the image memories of the other stations at the same time. After writing the image data, the station 1001 issues an "end of the image transfer" command, then each station starts printing the image.

In any case as explained above, the "start printing" command with instruction indicating that the number of copies is "zero" is issued to non-selected stations at the selecting operation. In this case, although the station does not print when it received the "start printing" command indicating that the number of copies, "zero", the station relay the image signal after comparing the address requesting start included in the "start printing" command and the address of itself, and by changing the I/F, if necessary, so that the image signal can reach the object station or stations.

Further, when an arbitrary station connected to the tandem connection system is performing copying locally (means that copying without using other stations), interruption is prevented by the serial communication of the tandem communication system. If the station is the master station, a status transfer command of itself and the status request command to slave stations are issued at a predetermined time interval. Whereas if the station is the slave station, it is set so that the status transferring command of itself is issued at a predetermined time interval.

Thus, it is possible to prevent unnecessary interruption during copying operation, as well as inform the status of itself to the other stations. When the local copying is completed, the interruption by the serial communication in the tandem connection system is permitted, further the slave station issues the status transfer command in response to the status request command issued by the master station.

Furthermore, as shown in an example of the control panel in FIG. 6, in a case where a station from which a user tries to output can not output the image for any reasons such as short of paper, a message saying that "the station can not be used" is displayed, and the station can not be selected as a receiving-side station of the image data. In a case where a station with which a user tries to read and transmit an original image can not read because of any reasons such as lamp failure, a message saying that "the station can not be used" is displayed, and the station can not be selected as a transmitting-side station of the image data. In both of these cases, the available stations are displayed for users convenience.

Thus, according to the present embodiment, it is possible to print the original image not only by the station where the original image is inputted but also by the other stations by transferring data of the read original image after converting the original image on the platen of one station into digital image data.

It should be noted that the relationship between the stations is master and slaves in this embodiment, however, the present invention is not limited to this relationship. For example, in a tandem connection system, without defining the master station, that is, without providing an interface clear command and the status request command used only by the master station in command set, the same object is achieved by a system, such that when each station finish its own initialization just after power on, it starts issuing the status transfer command at a predetermined time interval (while no other station is sending any command, needless to say).

In this case, the master station, which controls the entire system, is not defined, thus the timing control for the station status transfer and the confirmation of the reception of the information by the stations becomes a little difficult. Thus, it is not avoidable that the system suffers relatively low throughput to some extent However, it is noted as another advantage that the communication control among stations and the command system can be simplified.

Figure 13:
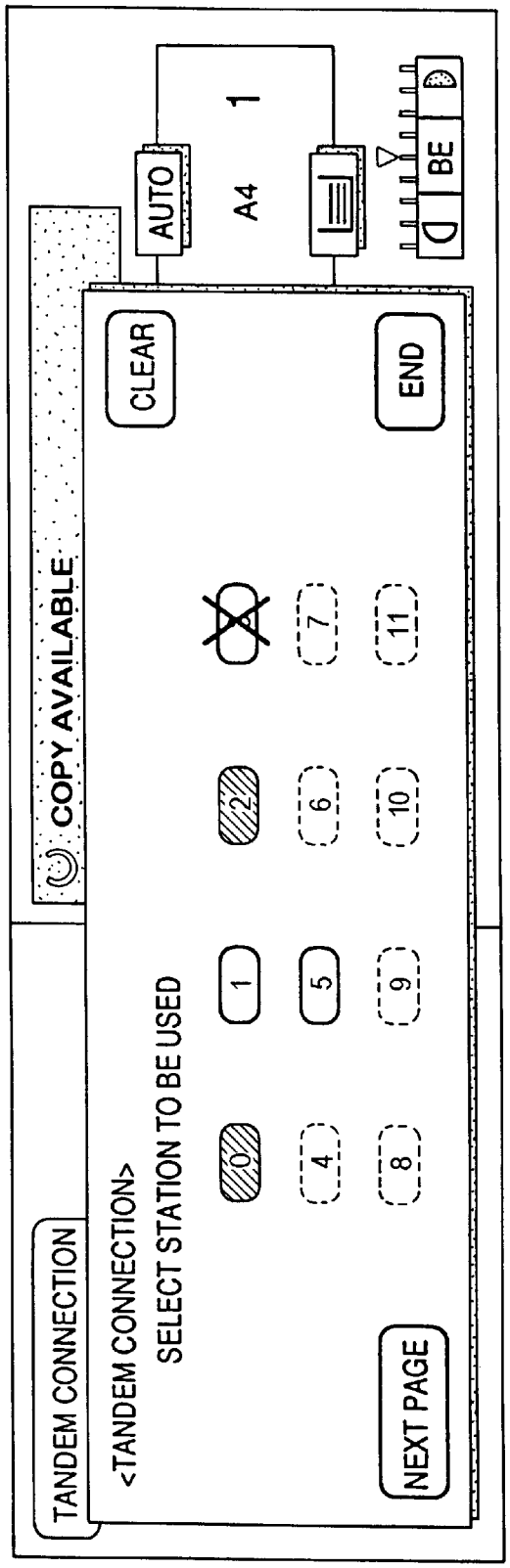
FIG. 13 shows an another example of a display on the control panel of the color copying machine composing the tandem connection system.

Further, according to this embodiment, the selection of the receiving-side station of an image is performed by using the control panel shown in FIG. 6, however, the present invention is not limited to this. For example, the same selection can be performed by using a display capable of changing the iconic representation showing station numbers in accordance with the status of stations as shown in FIG. 13.

The present invention can be applied to a system constituted by a plurality of devices. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A control apparatus integrated in an image processing apparatus, said control apparatus comprising:

a first interface unit, adapted to input information from and to output information to a first external apparatus, wherein said first interface unit is operable both in a first mode, in which information is input from the first external apparatus, and in a second mode, in which information is output to the first external apparatus;

a second interface unit, adapted to input information from and to output information to a second external apparatus, wherein said second interface unit is operable both in a first mode, in which information is input from the second external apparatus, and in a second mode, in which information is output to the second external apparatus;

a third interface unit, adapted to output the information inputted by at least one of said first interface unit and said second interface unit, to the image processing apparatus; and a control interface unit, adapted to input a control signal from the image processing apparatus and to establish a dedicated data channel, in accordance with the control signal, between said first interface unit and either said second interface unit or said third interface unit, or between said second interface unit and either said first interface unit or said third interface unit.

2. The control apparatus according to claim 1, wherein said control apparatus is operative in a mode in which the information inputted by one of said first and second interface units is outputted from the other of said first and second interface units.

3. The control apparatus according to claim 1, wherein said control apparatus is operative in at least one of a mode in which the information inputted by one of said first and second interface units is outputted from said third interface unit and not from the other of said first and second interface units, and another mode in which the information inputted by one of said first and second interface units is outputted from both the other of said first and second interface units and said third interface unit.

4. The control apparatus according to claim 1, further comprising a fourth interface unit, adapted to input information from an external apparatus.

5. The control apparatus according to claim 4, wherein said control apparatus is operative in at least one of a mode in which the information inputted by said fourth interface unit is outputted from one of said first and second interface units, and another mode in which the information inputted by said fourth interface unit is outputted from both of said first and second interface units.

6. The control apparatus according to claim 4, wherein said control apparatus is operative in at least one of a mode in which the information inputted by said fourth interface unit is outputted from said third interface units and not from any of said first and second interface units, another mode in which the information inputted by said fourth interface unit is outputted from one of said first, second, and third interface units, and still another mode in which the information inputted by said fourth interface unit is outputted from said first, second, and third interface units.

7. The control apparatus according to claim 1, wherein the information inputted/outputted by said first, second, and third interface units includes image information.

8. The control apparatus according to claim 1, wherein an operation mode of said control apparatus is controlled based on information inputted by said first and second interface units.

9. The control apparatus according to claim 1, wherein said control apparatus is connected to an information processing apparatus, and said third interface unit communicates information with the information processing apparatus.

10. The control apparatus according to claim 9, wherein said control apparatus inputs/outputs image information.

11. A control apparatus integrated in an image processing apparatus, said control apparatus comprising:

a first input/output unit, adapted to input information from and to output information to a first external apparatus, wherein said first input/output unit is operable both in a first mode, in which information is input from the first external apparatus, and in a second mode, in which information is output to the first external apparatus;

a second input/output unit, adapted to input information from and to output information to a second external apparatus, wherein said second input/output unit is operable both in a first mode, in which information is input from the second external apparatus, and in a second mode, in which information is output to the second external apparatus;

a first interface unit, adapted to output the information inputted by at least one of said first and second input/output units, to the image processing apparatus; and a control interface unit, adapted to input a control signal from the image processing apparatus and to establish a dedicated data channel, in accordance with the control signal, between said first input/output unit and either said second input/output unit or said first interface unit, or between said second input/output unit and either said first input/output unit or said first interface unit.

12. The control apparatus according to claim 11, wherein said control apparatus is operative in a mode in which the information inputted by one of said first and second input/output units is outputted from the other of said first and second input/output units.

13. The control apparatus according to claim 11, wherein said control apparatus is operative in at least one of a mode in which the information inputted by said first interface unit is outputted from one of said first and second input/output units, and another mode in which the information inputted by said first interface unit is outputted from both of said first and second input/output units.

14. The control apparatus according to claim 11, further comprising a second interface unit, adapted to input information from an external apparatus.

15. The control apparatus according to claim 14, wherein said control apparatus is operative in a mode in which the information inputted by one of said first and second interface units is outputted from the other of said first and second interface units.

16. The control apparatus according to claim 14, wherein said control apparatus is operative in at least one of a mode in which the information inputted by said second interface unit is outputted from one of said first and second input/output units, and another mode in which the information inputted by said second interface unit is outputted from both of said first and second input/output units.

17. The control apparatus according to claim 11, wherein the information inputted/outputted by said first and second input/output units, and the information outputted by said first interface unit, includes image information.

18. The control apparatus according to claim 11, wherein an operation mode of said control apparatus is controlled based on information inputted by said first and second input/output units.

19. The control apparatus according to claim 11, wherein said control apparatus is connected to an information processing apparatus, and said first interface unit communicates information with the information processing apparatus.

20. The control apparatus according to claim 19, wherein said control apparatus inputs/outputs image information.

* * * * *

UNITED STATES PATENT AND TRADEMARK OFFICE
CERTIFICATE OF CORRECTION

PATENT NO. : 6,400,463 B2
DATED : June 4, 2002
INVENTOR(S) : Toshiyuki Kitamura et al.

It is certified that error appears in the above-identified patent and that said Letters Patent is hereby corrected as shown below:

Title page, Item [54] and Column 1, line 1,
"IMAGE PROCESSING SYSTEM" should read -- IMAGE PROCESSING SYSTEM FOR CONCURRENTLY FORMING THE SAME IMAGE ON PLURAL APPARTUSES --.

Item [57], ABSTRACT,
Line 10, "station" should read -- stations --.

Column 1,
Line 22, "sets" should read -- of sets --.
Line 29, "control" should read -- controls --.
Line 43, "depends" should read -- depend --.
Line 63, "configurations" should read -- configuration --.

Column 3,
Line 10, "cross sectional" should read -- cross-sectional --.

Column 4,
Line 32, "stations are" should read -- station is --.
Line 38, "are" should read -- is --.
Line 46, "outputted" should read -- are outputted --.

Column 5,
Line 26, "replay by" should read -- reply to --.

Column 7,
Line 35, "a" should read -- an --.

Column 9,
Line 36, "a" should be deleted.
Line 55, "device" should read -- devices --.

Column 10,
Line 57, "sighals" should read -- signals, --.

UNITED STATES PATENT AND TRADEMARK OFFICE
CERTIFICATE OF CORRECTION

PATENT NO. : 6,400,463 B2
DATED : June 4, 2002
INVENTOR(S) : Toshiyuki Kitamura et al.

It is certified that error appears in the above-identified patent and that said Letters Patent is hereby corrected as shown below:

Column 11,
Line 17, "station" should read -- stations is --.

Column 12,
Line 43, "follow," should read -- follows, --.
Line 63, "follow," should read -- follows, --.

Column 13,
Line 16, "follow," should read -- follows, --.
Line 35, "follow," should read -- follows, --.
Line 55, "follow," should read -- follows, --.
Line 63, "BTCN2→#X" should read -- BTCN→X --.

Column 14,
Lines 7, 47 and 66, "follow," should read -- follows, --.

Column 15,
Lines 18, 41 and 63, "follow," should read -- follows, --.

Column 16,
Lines 19, 43 and 66, "follow," should read -- follows, --.

Column 17,
Lines 20, 42 and 63, "follow," should read -- follows, --.

Column 18,
Line 17, "follow," should read -- follows, --.

Column 19,
Line 19, "sub-canning" should read -- sub-scanning --.
Line 25, "try state" should read -- tristate --.
Line 26, "try state" should read -- tristate --.
Line 40, "each" should read -- each of the --.
Line 62, "any" should read -- on any --.

UNITED STATES PATENT AND TRADEMARK OFFICE
CERTIFICATE OF CORRECTION

PATENT NO. : 6,400,463 B2
DATED : June 4, 2002
INVENTOR(S) : Toshiyuki Kitamura et al.

It is certified that error appears in the above-identified patent and that said Letters Patent is hereby corrected as shown below:

Column 20,
Line 23, "A11" should read -- All --.
Line 38, "that" should be deleted; and "relay" should read -- relays --.
Line 44, "(means" should read -- (i.e., --.
Line 45, "that" should be deleted.
Line 63, "short" should read -- shortage --.

Column 21,
Line 4, "users" should read -- users' --.
Line 18, "finish" should read -- finishes --.

Column 22,
Line 34, "units" should read -- unit --.

Signed and Sealed this

Nineteenth Day of November, 2002

*Attest:*

JAMES E. ROGAN
Director of the United States Patent and Trademark Office

*Attesting Officer*